Figure 1:
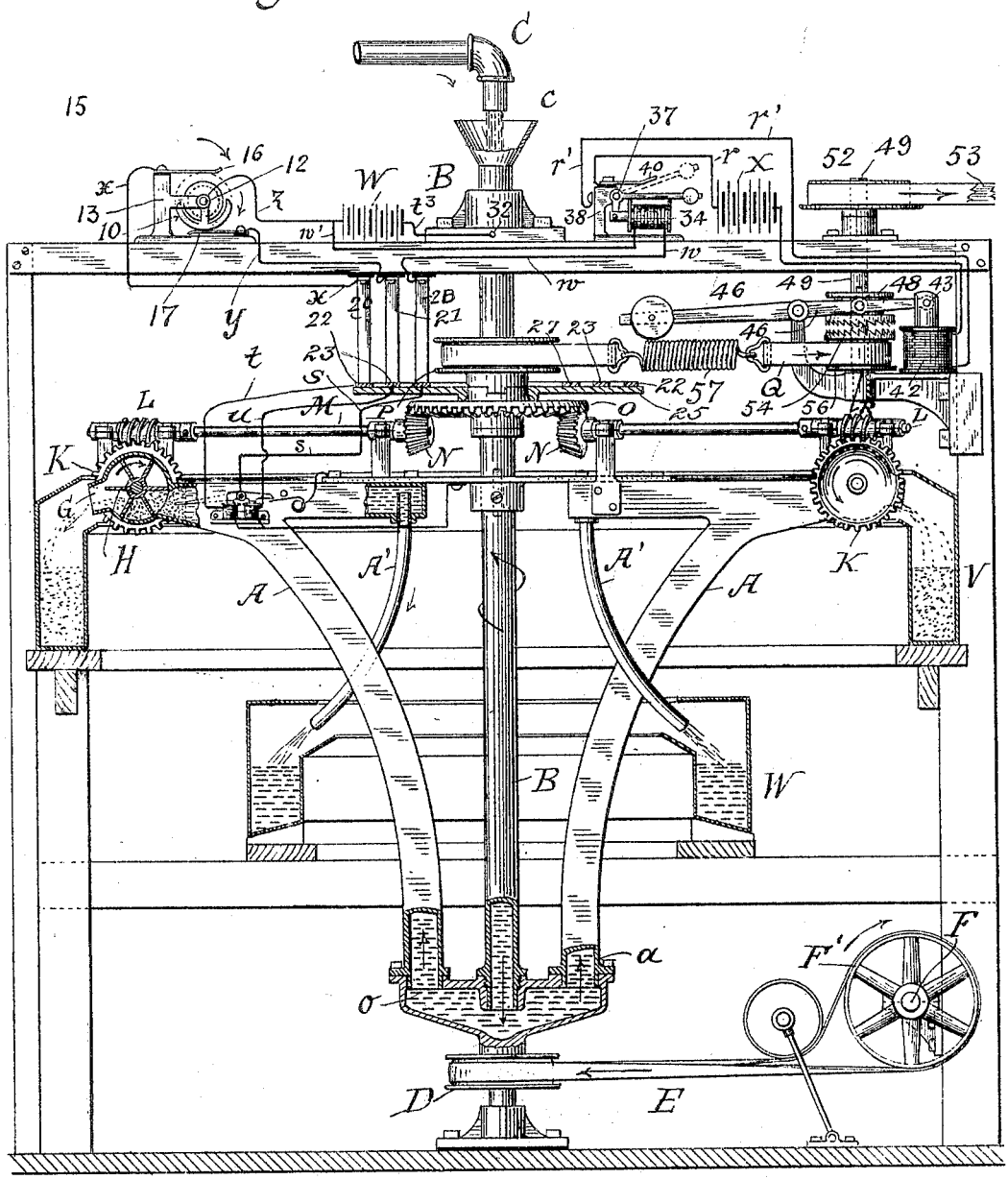

No. 802,473. PATENTED OCT. 24, 1905.
H. DE RAASLOFF.
VALVE REGULATOR FOR CENTRIFUGAL MACHINES.
APPLICATION FILED JUNE 6, 1904.

2 SHEETS—SHEET 1.

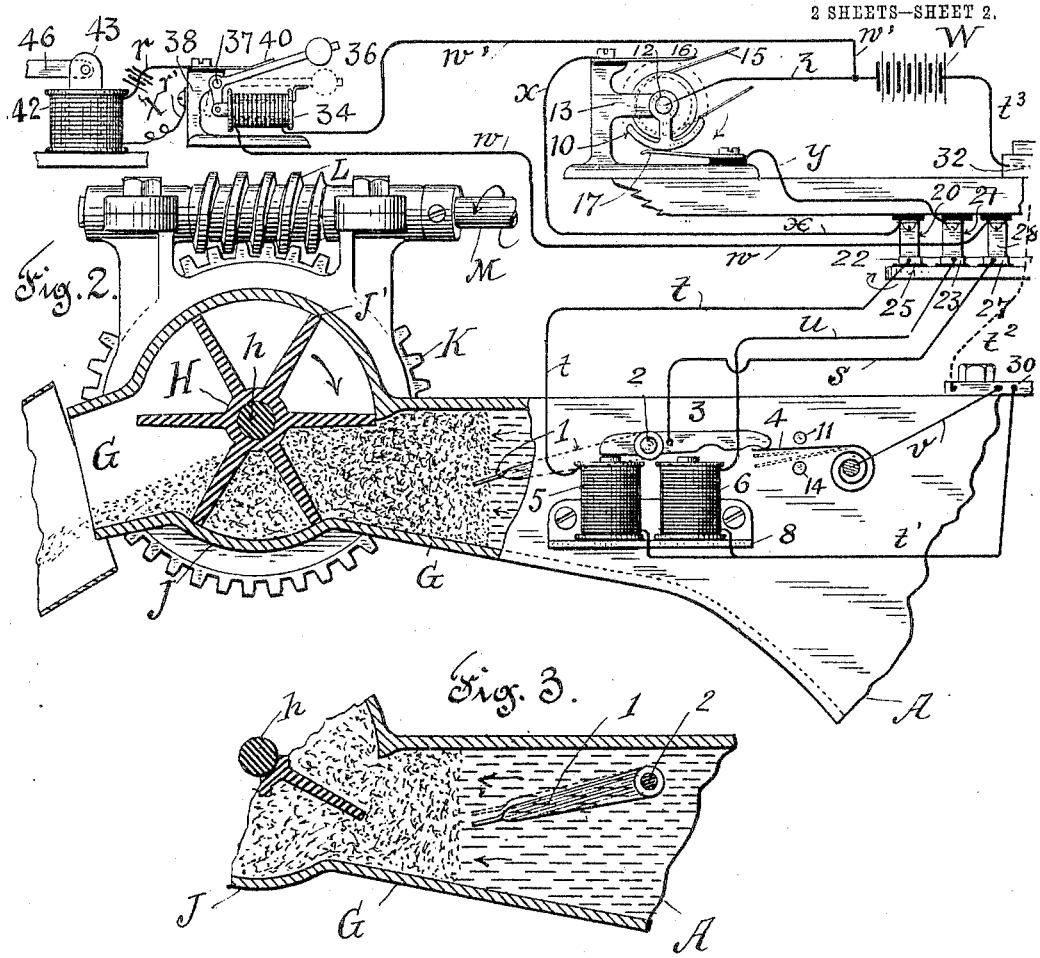
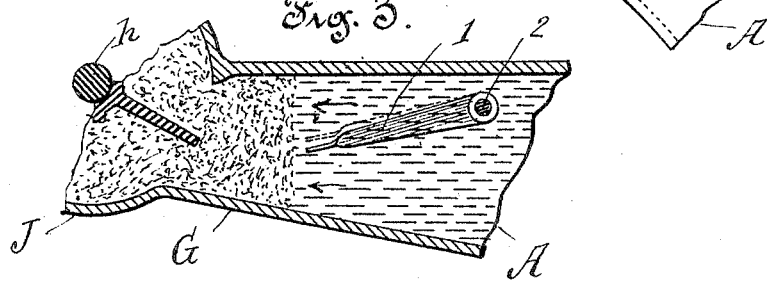
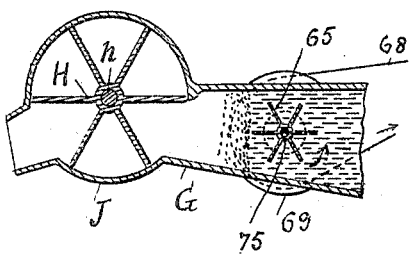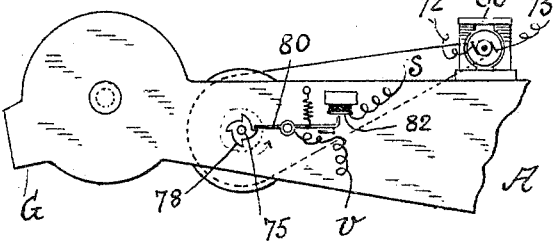

UNITED STATES PATENT OFFICE.

HARALD DE RAASLOFF, OF NEW YORK, N. Y.

VALVE-REGULATOR FOR CENTRIFUGAL MACHINES.

No. 802,473.    Specification of Letters Patent.    Patented Oct. 24, 1905.

Application filed June 6, 1904. Serial No. 211,414.

*To all whom it may concern:*

Be it known that I, HARALD DE RAASLOFF, a citizen of the United States of America, and a resident of the borough of Manhattan, in the city, county, and State of New York, have invented certain new and useful Improvements in Valve-Regulators, of which the following is a specification.

This invention relates to improvements in automatic valve-regulators, and especially of that class wherein the regulation of the valve is effected through the varying density or consistency of a solution.

Particularly the invention relates but is not limited to the automatic regulation of valves of centrifugal machines by which the separated material is discharged. Usually the separated material is of greater density than the liquid from which it separates, and this condition is assumed in the description of the invention hereinafter set forth; but the invention is also applicable to machines in which the separated material is lighter than the liquid from which it is separated.

I have found that hand regulation of the valves which control the discharge of the separated material from the machine and which material I term the "plug" is not sufficiently quick and certain to insure the best and most economical operation of the machine, especially where the liquid which remains after the plug separates is of value, as in the separation of the mud from solutions of precious metals, for with hand regulation of the valves considerable quantities of the precious liquid are wasted by opening the valves at improper times or keeping them open too long, or if the valves are not opened frequently enough the plug becomes so hard that it will not discharge. Therefore I have invented means for automatically controlling and regulating the opening and closing of the valves which depends upon the varying density of the plug. Said means are so related to the density of the plug and to the device which operates the valves that before any separation takes place in the machine the valves are closed and no liquid can escape. Then as the plug forms and reaches the desired density the valves open and allow the escape of the plug until the solution in the vessel becomes thinner, when the said controlling means again close the valves to prevent escape of this thinner solution, and so on.

Broadly considered in its relation to separators, therefore, my invention consists in the combination, with the valve or valves of a separator, of means to regulate the said valve or valves arranged to be so acted on by the varying density or consistency of the material in the machine that when the density or consistency of said material increases the said means open said valve or valves, and when the density or consistency of said material decreases the said means close said valve or valves. In the preferred form of my invention, of which two modifications are hereinafter described, the said regulating means comprises as an essential element a member which normally—that is, before the solution in the machine has separated, so as to open the valves—has a rapid motion and is situated in a part of the machine where the separation of the materials is taking place and near to the points of discharge. This place I term "the path of the separated materials," because said materials pass this place on their way to the outlets and valves. Now as the machine revolves and the separation takes place the separated materials gradually accumulate in the outlets and in that part of the vessel where said regulating means is, which place may be in the outlet-nozzles, but is preferably just inside the nozzles. As the separation continues the density of the separated materials around said means increases, thereby increasing the resistance which said means encounters as it moves, and when the proper consistency of the plug is attained the resistance is so great that the motion of said means ceases. This cessation of motion of the movable member is caused to start the valves by proper devices, such as electromagnets, in a circuit controlled by said means, and now the valves open and permit the plug to discharge, whereby the density of the materials around said regulating means is lessened, and resistance to the motion of said means becomes so small that said means again begin to move. This motion is now transmitted to the devices which operate the valves in such a manner that the valves close before any of the precious liquid has escaped. Now the plug again accumulates, the material around said means again thickens, and the same cycle of operations is repeated, and so on, whereby the operation of the machine becomes entirely automatic and continuous. The adjustment of the valves, the regulating means, the speed, and capacity of the machine are such that the plug is discharged from the machine at the rate at which it is formed, whereby, on the one hand, the machine is never choked by excessive accumulation of the separated materials, and, on the other hand, the precious liquid constituents are not permitted to escape from the valves, because there is always enough of the plug in the outlets to prevent the free liquid from having access to the valves.

Referring to the drawings, which accompany the specification to aid the description, Figure 1 is a broken elevation of a centrifugal machine equipped with a valve-regulator, which is operated by electric devices, the circuits and devices being represented diagrammatically. Fig. 2 is a broken sectional elevation, on a large scale, of the essential elements of Fig. 1, the plug being shown as accumulated sufficiently to cause the valves to open. Fig. 3 is a broken detail of part of the machine and representing the plug before it has accumulated sufficiently to open the valves. Fig. 4 is a broken section, and Fig. 5 a broken elevation, of a modification wherein the movable member inserted in the path of the separated material is a rotary wheel.

The centrifugal machine illustrated in the said drawings is provided with a hollow shaft B, having a funnel on its upper end, into which is discharged the mixed solid and liquid matters, such as the "pulp" in the cyanid process of gold extraction from a supply-pipe C. Any suitable number of boxes A A are symmetrically disposed and balanced around said shaft B and fastened to revolve therewith, the lower ends of said boxes being connected with a case $o$, which is fixed on the lower end of said shaft B, and the upper ends being fastened to a plate or spider, which is also fixed on said shaft B. The solution enters said boxes at the lower ends thereof from the lower end of said shaft B through said case $o$, as is clearly indicated in Fig. 1. Said machine is rapidly revolved by pulley D on said shaft B and belt E from main shaft F or by any other suitable means. Pipes A' A' discharge the liquid after separation, and the annular vessels V W, respectively, receive the plug and the liquid after their discharge from the boxes A. Each said box A has a discharge-nozzle G, controlled by a valve, which is preferably a paddle-wheel H, the arms of which revolve in the cylindrical chamber $j$ of the nozzle, and said valves H are driven by a wheel K on valve-shaft $h$, which said wheel K meshes with a worm L on a radial shaft M, said shaft M being carried in boxes on the standards $m$. A bevel-gear N on said shaft M meshes with a beveled annular differential gear O, mounted loosely on said hollow shaft B and connected or formed integral with a brake-wheel P, also loose on said shaft B, and a strap friction-brake Q of any ordinary kind is wound up by a drum R, which is controlled as hereinafter described.

The aforesaid arrangement of valves and means for operating the same is substantially similar to that described in my said patent, No. 707,521, and requires no further description here.

The mechanism for operating the valves herein shown and described is selected as a simple and effective mechanism for illustrating the application of my invention to the valves of a centrifugal machine; but any other means of operating the valves could be employed and other types of valves might be substituted for the paddle-wheel valves.

The valve-regulator (illustrated in Figs. 1 and 2 and 3) is constructed and arranged and operates in the following manner: In the path of the separated materials and in or just back of the nozzle G of one of the boxes A is an arm 1 on a rock-shaft 2, which passes out through a suitable stuffing-box to the outside of the box, its outer end having a fixed bar-armature 3, vibrated rapidly by weak electromagnets 5 6, which are carried on a shelf 8 on the side of the box A, until the resistance offered by the accumulated separated material or plug around the end of the arm 1, which is flattened like a paddle to increase its resistance, becomes so great as to stop the oscillation. The free end of said armature 3 instantaneously contacts with a spring-brush 4 as said armature vibrates. The current is sent alternately through said magnets 5 and 6 by any suitable device, as the alternator illustrated in Fig. 2, where 10 is a circular segment on a rapidly-rotating shaft 12, turning in bearings in a frame 13, supported on a stationary part of the apparatus. Said shaft 12 is driven independently of the centrifugal machine, as by pulley and belt 15, from a suitable counter-shaft. As said segment 10 revolves it alternately contacts with the brushes 16 17, which form terminals of circuits $x$ and $y$, respectively, leading to brushes 20 21. A third wire $z$ ultimately leads to the generator W. Said brushes 20 21 being on a stationary part of the apparatus, are arranged to contact, respectively, with rings 22 23, mounted on and suitably insulated from the top plate 25 of the centrifugal machine, and said plate 25 is carried by said standards $m$. From said rings 22 23, respectively, extend wires $t$ $u$ to the spools of the said electromagnets 5 6, the wires from said spools ultimately joining in wire $t'$, connecting with a plate 30 and to the shaft B, to the stationary bearing 32, and by wire $t^3$ to generator W. From said brush 4 a wire $v$ goes to said plate 30 and thence through shaft B, collar 32, and wire $t^3$ to said generator W. From said generator W a wire $w'$ goes to a solenoid 34, the wire $w$ connecting said solenoid 34 with a brush 28, which contacts with a ring 27 on the centrifugal machine, from which ring 27 a wire $s$ leads to the aforesaid armature 3. The core of said solenoid 34 is pivotally connected with a bent counterweighted lever 36, pivoted at 37 to a frame 38, which is supported on a stationary part of the apparatus, said arm 36 making contact when in the position of Fig. 2 with a brush 40, which is a terminal of a circuit $r$, through a powerful solenoid 42, and said arm 36, being the other terminal thereof, through said frame 38, from which brush 40 is insulated. The current for solenoid 42 is furnished by a generator X. The core 43 of said solenoid 42 is operatively connected by counterpoised lever 46 in any usual manner with the collar of one member 48 of a clutch, which is feathered on a shaft 49, turning in bearings on a stationary part of the apparatus and driven from a suitable counter-shaft by belt and pulley 52 53. The other member 54 of said clutch is loose on said shaft 49 and integral or fastened with said drum R, on which is wound the said brake-strap Q, 57 being a spring to slacken said strap.

The aforesaid wires, brushes, and other elements of the electric devices will of course be suitably insulated in any manner known to the art, and when the current is taken to the shaft B, as hereinbefore described, the machine will be suitably insulated from its base-plate and other parts of the framing.

The operation is as follows: When the solution first enters the machine and before separation of the ingredients takes place, the strap-brake Q will be slack off its brake-wheel P, and the valves H will be motionless, and will consequently close the outlet-nozzles, as plainly appears in Fig. 2, the space between the blades of the valve being less than the length of the curved part $j\ j$ of said nozzles. In these circumstances the solution will oppose so little resistance to the arm 1 that both it and the armature 3 will be vibrated rapidly by the alternate magnetization of said magnets 5 6, which is effected by the rotation of the alternator 10, as will be clearly understood without further description. As said armature 3 vibrates it instantaneously contacts with brush 4, and a momentary current then goes to solenoid 34, but is of too short duration to cause the solenoid to draw in its core, and consequently arm 36 does not close the circuit against brush 40, and the solenoid 42 is therefore not magnetized, clutch 48 54 is not operated, and the brake-strap Q is not drawn tight against its brake-wheel. The valves H therefore remain closed until the heavy materials gradually separating from the liquid form a plug in the nozzles G, which plug at length extends so far back in the nozzles and box A as to impede the vibration of said arm 1, the power of said magnets 5 6 being but small. When said arm 1 can no longer vibrate because of the resistance of the plug, the armature 3 will make durable contact with spring-brush 4, the stops 11 14 permitting of the contact at whatever position said arm 1 may come to rest. Now the current through solenoid 34 continues long enough to draw in the core and raise arm 36 into contact with brush 40, whereby current is sent to solenoid 42, the said clutch 48 54 is operated, and drum R tightens strap Q on its brake-wheel, whereby the velocity of the differential gear O decreases, and the valves H therefore begin to revolve in the direction of the arrow, Fig. 2, discharging the plug. When the plug is discharged and the solution around arm 1 becomes again thin enough to permit said arm to vibrate, the solenoid 34 being no longer able to hold up arm 36, the current through solenoid 42 is broken, the clutch members 48 54 separated, the brake-strap Q slackens off its wheel P, and the valves stop until the separated material around the end of arm 1 again thickens sufficiently to stop said arm.

Referring to Figs. 4 and 5, the controller is a paddle-wheel 65, situated in the path of the separated materials and driven by slight power from any suitable motor, as the electric motor 66, by the belt and pulleys 68 69. The circuit-wires 72 73 for said motor 66 are taken from rings which revolve in contact with stationary brushes which are terminals of a circuit from a suitable generator W, the alternator being omitted, since the wheel 65 revolves continuously in the same direction. The shaft 75 of said wheel 65 goes out through the side of the box in a long stuffing-box 76 and has a cam-wheel 78, which vibrates a lever 80, suitably counterpoised by weight or spring. The other end of said lever 80 has a contact-point which makes instantaneous contact with a spring-brush 82 as said lever 80 vibrates, and said lever 80 and brush 82 are terminals of the electric circuit to the solenoid 34, the wires and brushes being arranged as hereinbefore described. As long as the solution is thin, said wheel 65 revolving rapidly, durable currents are not sent through solenoid 42, and therefore the valves H remain closed; but when the plug thickens around the blades of said wheel 65, its driving power being weak, said wheel stops, a durable current is sent through said solenoid 42, and the valves H revolve, discharging the plug, then stop when the solution is thinned, and so on, as hereinbefore described.

Now, having described my improvements, I claim as my invention—

1. The combination in an automatic valve-regulator of a valve and means to open and close the same, and a controller for said means comprising a movable member located in the path of a solution of variable density, whereby the movement of said member is checked as the density of the solution increases.

2. The combination in an automatic valve-regulator of a valve and means to operate the same controlled by an electric circuit and means for opening and closing said circuit comprising a normally rapidly moving member located in the path of a solution of variable density, whereby the motion of said member is checked by the increasing density of the solution.

3. The combination in a centrifugal machine, of a rotary vessel in which the separation takes place provided with a discharge-outlet, a valve controlling said outlet, means to operate said valve, and an automatic controller for said means comprising a rapidly-moving member located in said vessel in the path of the separated material, substantially as described.

4. The combination in a centrifugal machine, of a rotary vessel in which the separation takes place provided with a discharge-outlet, a valve controlling said outlet, means for operating said valve controlled by an electric circuit and means for opening and closing said circuit comprising a normally rapidly moving member located in said vessel in the path of the separated material, substantially as described.

5. The combination in a valve and devices for opening and closing the same, an electrically-operated controller for said devices, and means for opening and closing the electric circuit to said controller comprising a rapidly-movable member located in the path of a solution of variable consistency.

6. The combination in a valve-regulator of a valve and electrically-controlled devices for opening and closing said valve, and means for opening and closing the electric circuit to said devices comprising a movable member located in the path of a solution of variable consistency and a motor for normally rapidly moving said member.

7. The combination in a valve-regulator of a valve and electrically-controlled devices for opening and closing said valve, and means for opening and closing the electric circuit to said devices comprising a vibratory member located in the path of a solution of variable consistency and means for normally vibrating said member.

8. The combination in a centrifugal machine of a rotary valve controlling the discharge of the separated materials, means for actuating said valve, and a controller for said means comprising a normally rapidly movable member located in the path of the separated materials, whereby the motion of said member is checked when the consistency of the separated materials increases.

9. The combination in a centrifugal machine of a rotary valve controlling the discharge of separated materials, means for actuating said valve, an electric circuit controlling said means, and a make-and-break device in said circuit comprising a normally rapidly movable member located in the path of the separated materials.

10. The combination of a rotatable valve and worm-gear for driving same, means for driving the worm-gear, controlled by an electric circuit, and a make and break in said circuit comprising a normally rapidly movable member located in the path of a solution of variable consistency.

11. The combination in a centrifugal machine of a plurality of valves for controlling the discharge of separated materials, means for actuating said valves, and a controller for said means comprising a normally rapidly movable member located in the path of the separated material.

12. The combination in a centrifugal machine, of a plurality of valves controlling the discharge of separated material, means for actuating said valves, an electric circuit controlling said means, and a make and break in said circuit comprising a normally rapidly movable member located in the path of the separated material.

Signed at New York city this 28th day of May, 1904.

HARALD DE RAASLOFF.

Witnesses:
 GRIFFITH COOMBS,
 HENRY V. BROWN.